(12) United States Patent
Tomikawa (10) Patent No.: US 9,670,411 B2
(45) Date of Patent: Jun. 6, 2017

(54) LIQUID CRYSTAL DEVICE, METHOD OF MANUFACTURING LIQUID CRYSTAL DEVICE, AND ELECTRONIC APPARATUS

(71) Applicant: Seiko Epson Corporation, Tokyo (JP)

(72) Inventor: Naoki Tomikawa, Fujimi-machi (JP)

(73) Assignee: Seiko Epson Corporation, Tokyo (JP)

( * ) Notice: Subject to any disclaimer, the term of this patent is extended or adjusted under 35 U.S.C. 154(b) by 71 days.

(21) Appl. No.: 14/593,084

(22) Filed: Jan. 9, 2015

(65) Prior Publication Data

US 2015/0198827 A1 Jul. 16, 2015

(30) Foreign Application Priority Data

Jan. 14, 2014 (JP) .................................. 2014-003961

(51) Int. Cl.
*G02F 1/1337* (2006.01)
*C09K 19/56* (2006.01)

(52) U.S. Cl.
CPC ........ *C09K 19/56* (2013.01); *G02F 1/133719* (2013.01); *G02F 1/133723* (2013.01); *G02F 1/1337* (2013.01); *G02F 1/133711* (2013.01)

(58) Field of Classification Search
CPC ......... G02F 1/133719; G02F 1/133711; G02F 1/1337
See application file for complete search history.

(56) References Cited

FOREIGN PATENT DOCUMENTS

| JP | 06-273710 A | 9/1994 |
|---|---|---|
| JP | 08-0320471 A | 12/1996 |
| JP | 09-0301943 A | 11/1997 |
| JP | 11-223815 A | 8/1999 |
| JP | 11-223816 A | 8/1999 |
| JP | 2002-014354 A | 1/2002 |
| JP | 2004-256677 A | 9/2004 |
| JP | 2006-290833 A | 10/2006 |
| JP | 2007-140017 A | 6/2007 |
| JP | 2009-288436 A | 12/2009 |
| JP | 2011-215455 A | 10/2011 |

*Primary Examiner* — Wen-Ying P Chen
(74) *Attorney, Agent, or Firm* — ALG Intellectual Property, LLC (57) ABSTRACT

There is provided a liquid crystal device including an element substrate, a counter substrate which is arranged to face the element substrate, a liquid crystal layer which is arranged between the element substrate and the counter substrate, and inorganic alignment films which are arranged between the element substrate and the liquid crystal layer and between the counter substrate and the liquid crystal layer. A silane compound film with which a fullerene is modified is arranged to cover the inorganic alignment film.

8 Claims, 9 Drawing Sheets

LIQUID CRYSTAL DEVICE, METHOD OF MANUFACTURING LIQUID CRYSTAL DEVICE, AND ELECTRONIC APPARATUS

BACKGROUND

1. Technical Field

The present invention relates to a liquid crystal device, and an electronic apparatus.

2. Related Art

A liquid crystal device, which includes, for example, transistors as elements for performing switching control on pixel electrodes for respective pixels, in an active drive manner is known as a liquid crystal device. The liquid crystal device is used for, for example, a direct viewing display, a light valve, or the like.

The liquid crystal device is formed in such a way that liquid crystal is sealed between a pair of substrates through a sealing material. In the liquid crystal, radicals are generated due to, for example, excessive light irradiation. Accordingly, a reaction occurs between molecules or a reaction occurs between alignment films. When such a reaction occurs, defects may occur in alignment of the liquid crystal, and thus there is a problem in that display quality is lowered.

Here, for example, as disclosed in JP-A-2007-140017, a method of forming fullerenes which capture radicals on an alignment film, on which oblique deposition is performed, through an adhesion improvement layer using an oblique deposition method is disclosed.

However, the method disclosed in JP-A-2007-140017 has a structure in which a radical capture film, which is formed of fullerenes, is formed on an adhesion improvement layer. Therefore, when the liquid crystal is supplied between the pair of substrates, there is a problem in that the fullerenes may separate from the surface of the alignment film and float in the liquid crystal. Accordingly, a display quality is affected, and thus there is a problem of the deterioration of reliability.

SUMMARY

The invention can be realized in the following forms or application examples.

Application Example 1

According to this application example, there is provided a liquid crystal device including: a first substrate; a second substrate that is arranged to face the first substrate; a liquid crystal layer that is arranged between the first substrate and the second substrate; a first inorganic alignment film that is arranged between the first substrate and the liquid crystal layer; and a second inorganic alignment film that is arranged between the second substrate and the liquid crystal layer, and a first film of a silane compound, with which fullerenes are modified, is arranged to cover the first inorganic alignment film and the second inorganic alignment film.

In this case, the first film of the silane compound, with which the fullerenes are modified, is arranged to cover the first inorganic alignment film and the second inorganic alignment film. Therefore, even when, for example, excessive light is applied to the liquid crystal layer and radicals are generated, it is possible to capture the radicals using the fullerenes, and thus it is possible to suppress the deterioration of the display quality such as the generation of the alignment defect of the liquid crystal. More specifically, since the first film is arranged by coupling a silane compound, with which the fullerenes are modified, to silanols on the surfaces of the first inorganic alignment film and the second inorganic alignment film, it is possible to suppress separation of the fullerenes from the surface of the inorganic alignment film.

Application Example 2

According to this application example, there is provided a liquid crystal device including: a first substrate; a second substrate that is arranged to face the first substrate; a liquid crystal layer that is arranged between the first substrate and the second substrate; a first alignment film that is arranged between the first substrate and the liquid crystal layer; and a second alignment film that is arranged between the second substrate and the liquid crystal layer, in which a second film, which includes the fullerenes, is arranged between the first alignment film and the first substrate and between the second alignment film and the second substrate.

In this case, the second film of the silane compound, with which fullerenes are modified, is arranged between the first alignment film and the base of the second alignment film. Therefore, even when, for example, excessive light is applied to the liquid crystal layer and radicals are generated, it is possible to capture the radicals, which pass through the first alignment film and the second alignment film, using the fullerenes. Therefore, it is possible to suppress the deterioration of the display quality such as the generation of the alignment defect of the liquid crystal. In addition, since the alignment film is arranged on the second film of the silane compound, with which the fullerenes are modified, and the alignment film directly comes into contact with the liquid crystal, it is possible to increase an orientation regulation force.

Application Example 3

According to this application example, there is provided a liquid crystal device including: a first substrate; a second substrate that is arranged to face the first substrate; a liquid crystal layer that is arranged between the first substrate and the second substrate; a first organic alignment film that is arranged between the first substrate and the liquid crystal layer; and a second organic alignment film that is arranged between the second substrate and the liquid crystal layer, in which the first organic alignment film and the second organic alignment film include polyimide including the fullerenes.

In this case, the first organic alignment film and second organic alignment film include polyimide including the fullerenes. Therefore, for example, even when excessive light is applied to the liquid crystal layer and radicals are generated, it is possible to capture the radicals using the fullerene. Accordingly, it is possible to suppress the deterioration of the display quality such as the generation of the alignment defect of the liquid crystal. In addition, since the fullerenes are included in the entire organic alignment film, it is possible to increase a radical capturing ability. Accordingly, it is possible to suppress the deterioration of the display quality such as the generation of the alignment defect of the liquid crystal. In addition, it is possible to apply the invention to an organic alignment film.

Application Example 4

In the liquid crystal device, according to this application example, it is preferable that the fullerenes include at least one of fullerene C60 and a higher-order fullerene.

In this case, since the fullerene is used, it is possible to capture radicals included in the liquid crystal.

Application Example 5

According to this application example, there is provided an electronic apparatus including the liquid crystal device.

In the electronic apparatus according to the application example, since the liquid crystal device is included, it is possible to provide the electronic apparatus in which the deterioration of the display quality is suppressed.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, embodiments of the invention will be described with reference to the accompanying drawings. Meanwhile, the drawings which are used are displayed after being appropriately enlarged or reduced such that parts which are described are in a recognizable state.

Meanwhile, in embodiments below, for example, description "on a substrate" indicates a case of being arranged to come into contact with the top of the substrate, a case of being arranged on the substrate through other components, and a case of being arranged such that a part comes into contact with the top of the substrate and another part is arranged through other components.

In the embodiment, an active matrix type liquid crystal device which includes Thin Film Transistors (TFTs) as the switching elements of pixels will be described as an example of a liquid crystal device. The liquid crystal device can be suitably used as, for example, the light modulation element (liquid crystal light valve) of a projection-type display apparatus (liquid crystal projector).

First Embodiment

Configuration of Liquid Crystal Device

Figure 1:
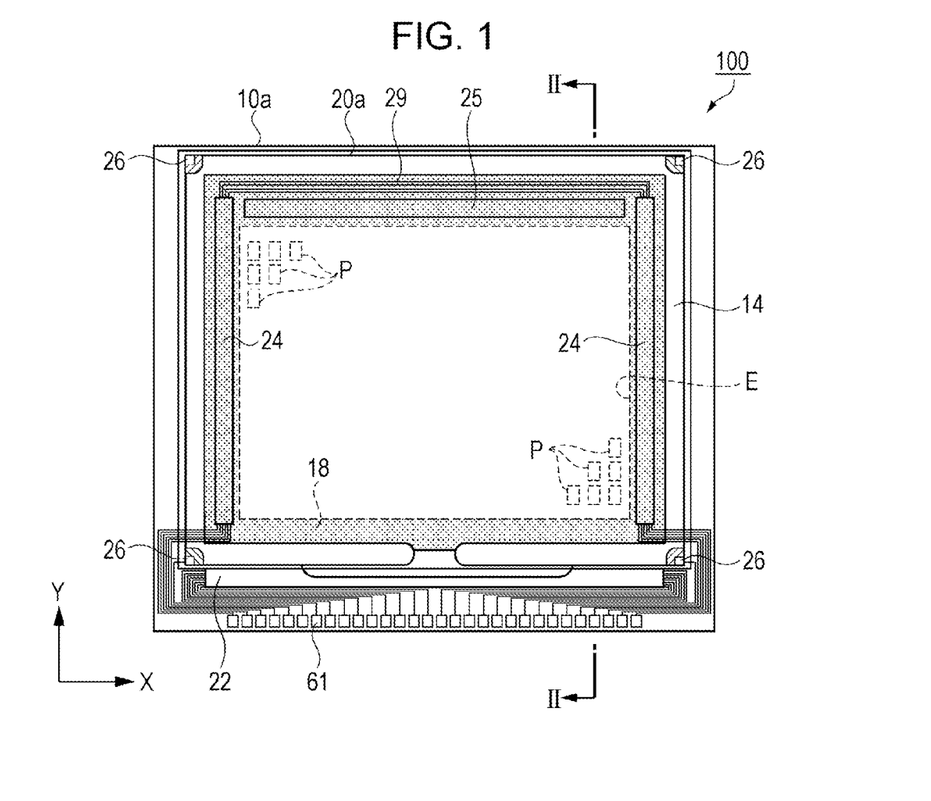
FIG. 1 is a schematic plan diagram illustrating the configuration of a liquid crystal device according to a first embodiment.
Figure 2:
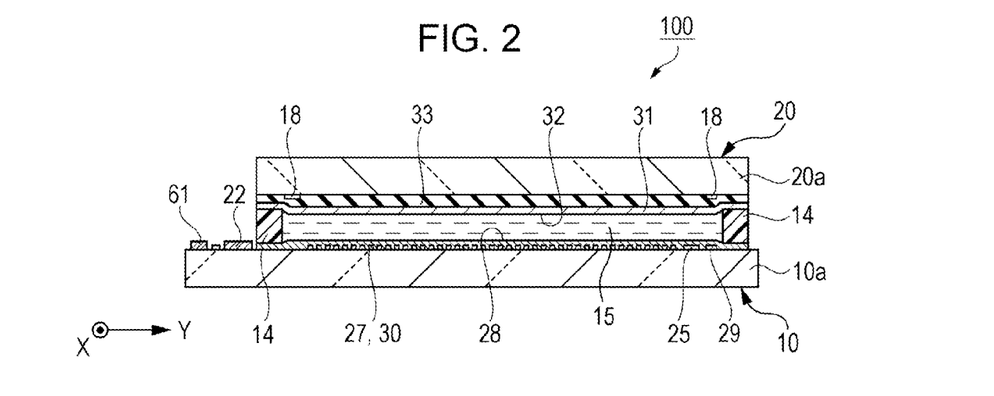
FIG. 2 is a schematic cross-sectional diagram taken along line II-II of the liquid crystal device shown in FIG. 1.
Figure 3:
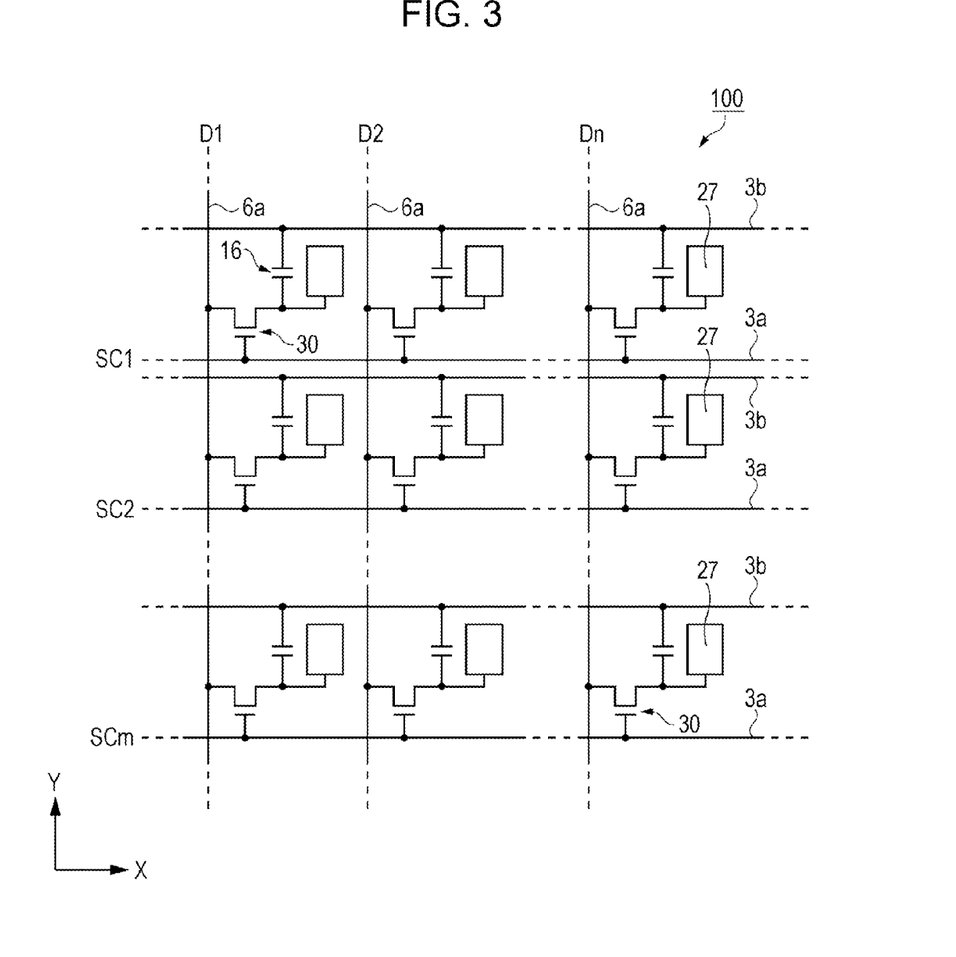
FIG. 3 is an equivalent circuit diagram illustrating the electrical configuration of the liquid crystal device.

FIG. 1 is a schematic plan diagram illustrating the configuration of a liquid crystal device. FIG. 2 is a schematic cross-sectional diagram taken along line II-II of the liquid crystal device shown in FIG. 1. FIG. 3 is an equivalent circuit diagram illustrating the electrical configuration of the liquid crystal device. Hereinafter, the configuration of the liquid crystal device will be described with reference to FIGS. 1 to 3.

As shown in FIGS. 1 and 2, a liquid crystal device 100 according to the embodiment includes an element substrate 10 (first substrate) and a counter substrate 20 (second substrate) which are arranged to face each other, and a liquid crystal layer 15 which is interposed between the pair of substrates.

The element substrate 10 is larger than the counter substrate 20, and both substrates are connected to each other while interposing a sealing material 14 which is arranged along the outer circumference of the counter substrate 20. The liquid crystal layer 15 is formed by pouring liquid crystal, which has positive or negative dielectric anisotropy according to an example of an electro-optic material, into a gap. For example, an adhesive agent, such as a thermosetting or ultraviolet curable epoxy resin, may be used as the sealing material 14. A spacer (glass beads) for fixedly maintaining the interval between the pair of substrates is mixed into the sealing material 14. The glass beads are used to generate a cell gap.

A pixel area E (display area), in which a plurality of pixels P contributing to display are arranged, is provided on the inside of the sealing material 14. A dummy pixel area (not shown in the drawing) which does not contribute to display is provided around the pixel area E. In addition, although not shown in FIGS. 1 and 2, a light shading section (Black Matrix; BM), which two-dimensionally partitions between the plurality of respective pixels P, is provided on the counter substrate 20 in the pixel area E.

A data line driving circuit 22 is provided between the sealing material 14 along the first peripheral section of the element substrate 10 and the first peripheral section. In addition, an inspection circuit 25 is provided between the sealing material 14 along another first peripheral section, which is opposite to the first peripheral section, and the pixel area E. Further, scan line driving circuits 24 are provided between the sealing material 14 along second peripheral sections, which are perpendicular to the first peripheral section and are opposite to each other, and the pixel area E. A plurality of wirings 29, which connect two scan line driving circuits 24, are provided between the sealing material 14 along another first peripheral section, which is opposite to the first peripheral section, and the inspection circuit 25.

A light shading film 18 (abandonment section) is provided on the inside of the sealing material 14, which is arranged in a frame shape on the side of the counter substrate 20, with the same frame shape. The light shading film 18 is formed of, for example, a light shading metal, a metal oxide, or the like, and the pixel area E which has the plurality of pixels P is inside the light shading film 18. Meanwhile, although not shown in FIG. 1, the light shading film, which two-dimensionally partitions the plurality of pixels P, is provided in the pixel area E.

The wirings, which connect the data line driving circuit 22 and the scan line driving circuits 24, are connected to a plurality of external connection terminals 61 which are arranged along the first peripheral section. Hereinafter, description will be made in such a way that a direction along the first peripheral section is an X direction and a direction along the second peripheral sections which are perpendicular to the first peripheral section and face each other, is a Y direction. Meanwhile, the arrangement of the inspection circuit 25 is not limited thereto and the inspection circuit 25 may be provided between the sealing material 14 along the data line driving circuit 22 and the pixel area E.

As shown in FIG. 2, transparent pixel electrodes 27 which are provided for the respective pixels P, and Thin Film Transistors (TFTs, hereinafter, referred to as "TFTs 30") which are the switching elements, signal wirings, and an inorganic alignment film 28 which covers the pixels and the elements are formed on the surface of the side of the liquid crystal layer 15 of a first substrate 10a.

In addition, a light shading structure, which prevents a switching operation from being unstable due to light which is incident to the semiconductor layer in the TFTs 30, is used. The element substrate 10 according to the invention includes at least the pixel electrodes 27, the TFTs 30, the signal wirings, and the inorganic alignment film 28.

A light shading film 18, an insulation layer 33 which is formed to cover the light shading film 18, counter electrodes 31 which are formed to cover the insulation layer 33, and an inorganic alignment film 32 which covers the counter electrodes 31 are provided on the surface of the side of the liquid crystal layer 15 of the counter substrate 20. The counter substrate 20 according to the invention includes at least the light shading film 18, the counter electrodes 31, and the inorganic alignment film 32.

The light shading film 18 is provided in a location which surrounds the pixel area E and two-dimensionally overlaps with the scan line driving circuits 24 and the inspection circuit 25 as shown in FIG. 1. Therefore, the light shading film 18 performs a function of shielding light which is incident to peripheral circuits including the driving circuits, from the side of the counter substrate 20, and preventing malfunctions of the peripheral circuits due to light. In addition, the light shading film 18 shields light such that unnecessary stray light is not incident to the pixel area E, thereby securing high contrast when display is performed on the pixel area E.

The insulation layer 33 is formed of, for example, an inorganic material such as silicon oxide, and is provided to have light transparency and to cover the light shading film 18. For example, a method of forming the insulation layer 33 using a plasma Chemical Vapor Deposition (CVD) method or the like may be an example of a method of forming such an insulation layer 33.

The counter electrodes 31 are formed of, for example, a transparent conductive film such as Indium Tin Oxide (ITO), and is configured to cover the insulation layer 33 and to electrically connect the wirings on the side of the element substrate 10 through vertical conduction parts 26 which are provided in the four corners of the counter substrate 20 as shown in FIG. 1.

The inorganic alignment film 28 which covers the pixel electrodes 27 and the inorganic alignment film 32 which covers the counter electrodes 31 are selected based on the optical design of the liquid crystal device 100. An inorganic alignment film, which is formed of an inorganic material such as silicon oxide (SiOx) using a vapor deposition method, which has negative dielectric anisotropy, and which is aligned to be approximately perpendicular to the liquid crystal molecules, may be an example of the inorganic alignment films 28 and 32.

Such a liquid crystal device 100 is a transmission type, and the optical design uses a normally white mode in which the transmittance of the pixels P acquired when a voltage is not applied is greater than the transmittance acquired when the voltage is applied or a normally black mode in which the transmittance of the pixels P acquired when the voltage is not applied is less than the transmittance acquired when the voltage is applied. Respective polarizing elements are used after being arranged on sides in which light is incident or light is emitted according to the optical design.

As shown in FIG. 3, the liquid crystal device 100 includes a plurality of scan lines 3a, a plurality of data lines 6a, and capacity lines 3b which are insulated and perpendicular to each other in at least the pixel area E. A direction in which the scan lines 3a extend is an X direction, and a direction in which the data lines 6a extend is a Y direction.

The pixel electrodes 27, the TFTs 30, and the capacity elements 16 are provided in areas which are divided by the scan lines 3a, the data lines 6a, the capacity lines 3b, and the signal lines, and the areas for, the pixel circuits of the pixels P.

The scan lines 3a are electrically connected to the gates of the TFTs 30, and the data lines 6a are electrically connected to the source/drain areas (source areas) on the data line sides of the TFTs 30. The pixel electrodes 27 are electrically connected to the source/drain areas (drain areas) on the pixel electrode sides of the TFTs 30.

The data lines 6a are connected to the data line driving circuit 22 (refer to FIG. 1), and supply image signals D1, D2, . . . , and Dn which are supplied from the data line driving circuit 22 to the pixels P. The scan lines 3a are connected to the scan line driving circuits 24 (refer to FIG. 1), and supply scan signals SC1, SC2, . . . , and SCm, which are supplied from the scan line driving circuit 24, to the respective pixels P.

The image signals D1 to Dn, which are supplied from the data line driving circuit 22 to the data lines 6a, may be sequentially supplied in this order or may be supplied for each group with regard to the plurality of data lines 6a which are adjacent to each other. The scan line driving circuits 24 line-sequentially supply the scan signals SC1 to SCm to the scan lines 3a at a predetermined timing in pulse manner.

Since the TFTs 30 which are switching elements are in an on-state for only a fixed period when the scan signals SC1 to SCm are input, the liquid crystal device 100 being configured such that the image signals D1 to Dn which are supplied from the data lines 6a are written in the pixel electrodes 27 at a predetermined timing. Further, the image signals D1 to Dn, which are written in the liquid crystal layer 15 through the pixel electrodes 27 at a predetermined level, are maintained during a fixed period between the pixel electrodes 27 and the counter electrodes 31, which are arranged to face the pixel electrodes 27 while interposing the liquid crystal layer 15 therebetween.

The liquid crystal capacities, which are formed between the pixel electrodes 27 and the counter electrodes 31, are connected to the capacity elements 16 in parallel in order to prevent the maintained image signals D1 to Dn from leaking. The capacity elements 16 are provided between the source/drain areas on the pixel electrode sides of the TFTs 30 and the capacity lines 3b. Each of the capacity elements 16 has a dielectric layer between two capacity electrodes.

Configuration of Pixel Included in Liquid Crystal Device

Figure 4:
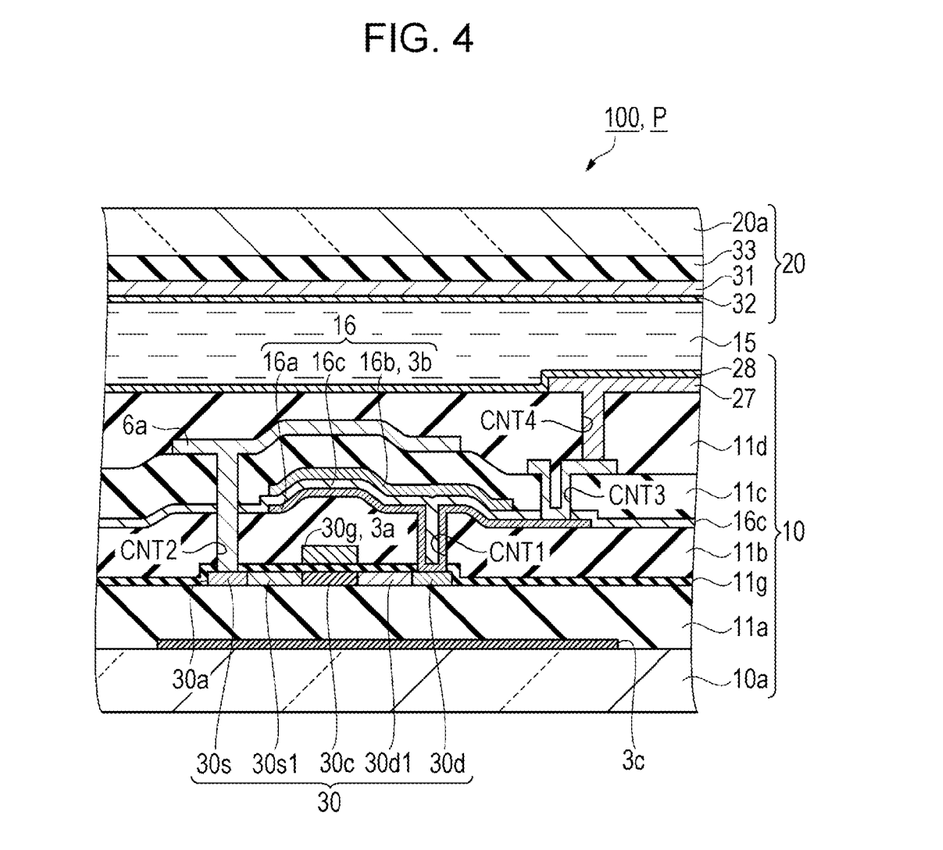
FIG. 4 is a schematic cross-sectional diagram mainly illustrating the structure of a pixel of the liquid crystal device.

FIG. 4 is a schematic cross-sectional diagram mainly illustrating the structure of a pixel of the liquid crystal device. Hereinafter, the structure of the pixel of the liquid crystal device will be described with reference to FIG. 4. Meanwhile, FIG. 4 illustrates the cross-sectional positional relationship between the respective components, and is displayed with a scale which can be clearly expressed.

As shown in FIG. 4, the liquid crystal device 100 includes the element substrate 10 and the counter substrate 20 which is arranged to be opposite thereto. The first substrate 10a included in the element substrate 10, and a second substrate 20a included in the counter substrate 20 are formed of, for example, a quartz substrate or the like.

As shown in FIG. 4, a lower side light shading film 3c which includes, for example, a material, such as aluminum (Al), titanium (Ti), chromium (Cr), or tungsten (W), is formed on a first substrate 10a. The lower side light shading film 3c is two-dimensionally patterned in a frame shape, and prescribes the opening area of each of the pixels P. Meanwhile, the lower side light shading film 3c may have conductivity, and may function as a part of the scan line 3a. A base insulation layer 11a which is formed of silicon oxide or the like is formed on the first substrate 10a and the lower side light shading film 3c.

The TFT 30, the scan line 3a, and the like are formed on the base insulation layer 11a. The TFT 30 has, for example, a Lightly Doped Drain (LDD) structure, and includes a semiconductor layer 30a which is formed of polysilicon (high purity polycrystalline silicon) or the like, a gate insulation layer 11g which is formed on the semiconductor layer 30a, and a gate electrode 30g which is formed of a polysilicon film or the like formed on the gate insulation layer 11g. The scan line 3a functions as the gate electrode 30g.

For example, N-type impurity ions, such as phosphorus (P) ions, are poured into the semiconductor layer 30a, and thus the semiconductor layer 30a is formed as an N-type TFT 30. More specifically, the semiconductor layer 30a includes a channel area 30c, a data line side LDD area 30s1, a data line side source/drain area 30s, a pixel electrode side LDD area 30d1, and a pixel electrode side source/drain area 30d.

The channel area 30c is doped with P-type impurity ions such as boron (B) ions. The other areas (30s1, 30s, 30d1, and 30d) are doped with N-type impurity ions such as phosphorus (P) ions. As above, the TFT 30 is formed as an N-type TFT.

A first interlayer insulation layer 11b, which is formed of silicon oxide or the like, is formed on the gate electrode 30g and the gate insulation layer 11g. The capacity element 16 is provided on the first interlayer insulation layer 11b. More specifically, the capacity element 16 is formed in such a way that the first capacity electrode 16a, which is electrically connected to the pixel electrode side source/drain area 30d of the TFT 30 and the pixel electrode 27 and functions as a pixel potential side capacity electrode, is arranged to face a part of the capacity line 3b (second capacity electrode 16b), which functions as a fixed potential side capacity electrode, while interposing a dielectric film 16c therebetween.

The dielectric film 16c is, for example, a silicon nitride film. The second capacity electrode 16b (capacity lines 3b) is formed of, for example, a group of metals, which includes at least one metal having a high melting point, such as titanium (Ti), chromium (Cr), tungsten (W), tantalum (Ta), or molybdenum (Mo), an alloy, a metal silicide, a polysilicide, or a material acquired by laminating these. Otherwise, the second capacity electrode 16b can be formed of an aluminum (Al) film.

The first capacity electrode 16a is formed of, for example, a conductive polysilicon film and functions as the pixel potential side capacity electrode of the capacity element 16. However, the first capacity electrode 16a may be formed of a single layer film, which includes a metal or an alloy, or a multi-layer film similar to the capacity line 3b. The first capacity electrode 16a performs a function as the pixel potential side capacity electrode, and a function to relay and connect the pixel electrode 27 with the pixel electrode side source/drain area 30d (drain area) of the TFT 30 through contact holes CNT1, CNT3, and CNT4.

The data line 6a is formed on the capacity element 16 through a second interlayer insulation layer 11c. The data line 6a is electrically connected to the data line side source/drain area 30s (source area) of the semiconductor layer 30a through the contact hole CNT2 which is open in the gate insulation layer 11g, the first interlayer insulation layer 11b, the dielectric film 16c, and the second interlayer insulation layer 11c.

The pixel electrode 27 is formed on the upper layer of the data line 6a while interposing the third interlayer insulation layer 11d therebetween. The third interlayer insulation layer 11d is formed of, for example, silicon oxide or nitride, a flattening process to flatten a projecting section on a surface, which is generated when the TFT 30 covers the provided area, being performed. For example, a Chemical Mechanical Polishing (CMP) process, a spin-coating process, or the like may be an example of a flattening process method. The contact hole CNT4 is formed in the third interlayer insulation layer 11d.

The pixel electrode 27 is connected to the first capacity electrode 16a through the contact holes CNT4 and CNT3, thereby being electrically connected to the pixel electrode side source/drain area 30d (drain area) of the semiconductor layer 30a. Meanwhile, the pixel electrode 27 is formed of, for example, a transparent conductive film such as an ITO film.

The inorganic alignment film 28 (first inorganic alignment film), in which an inorganic material such as silicon oxide ($SiO_2$) is obliquely deposited, is provided on the pixel electrode 27 and the third interlayer insulation layer 11d between the adjacent pixel electrodes 27. The liquid crystal layer 15, in which liquid crystal or the like is poured into a space surrounded by the sealing material 14 (refer to FIGS. 1 and 2), is provided on the inorganic alignment film 28.

In contrast, the insulation layer 33, which is formed of, for example, a PSG film (silicon oxide doped with phosphorus) or the like, is provided on the second substrate 20a (side of the liquid crystal layer 15). The counter electrode 31 is provided on the insulation layer 33 throughout the entire surface thereof. The inorganic alignment film 32 (second inorganic alignment film), in which the inorganic material such as silicon oxide ($SiO_2$) or the like is obliquely deposited, is provided on the counter electrode 31. The counter electrode 31 is formed of, for example, a transparent conductive film such as an ITO film similar to the above-described pixel electrode 27.

The liquid crystal layer 15 is in a predetermined alignment state due to the inorganic alignment films 28 and 32 in a state in which an electric field is not generated between the pixel electrode 27 and the counter electrode 31. The sealing material 14 is, for example, an adhesive agent which is formed of a light curing resin or a thermosetting resin for bonding the element substrate 10 and the counter substrate 20, and spacers, such as glass fibers or glass beads, are mixed therewith in order to set the distance between the element substrate 10 and the counter substrate 20 to a predetermined value.

Film (First Film) of Silicon Compound with which Fullerenes are Modified

Figure 5:
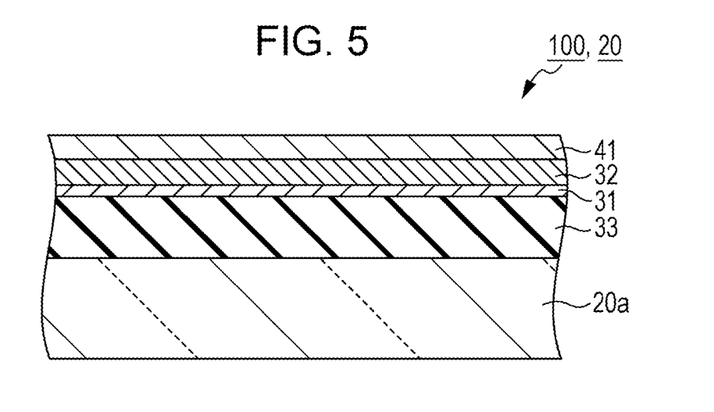
FIG. 5 is a schematic cross-sectional diagram illustrating the structure of the surface of an inorganic alignment film in detail.
Figure 6:
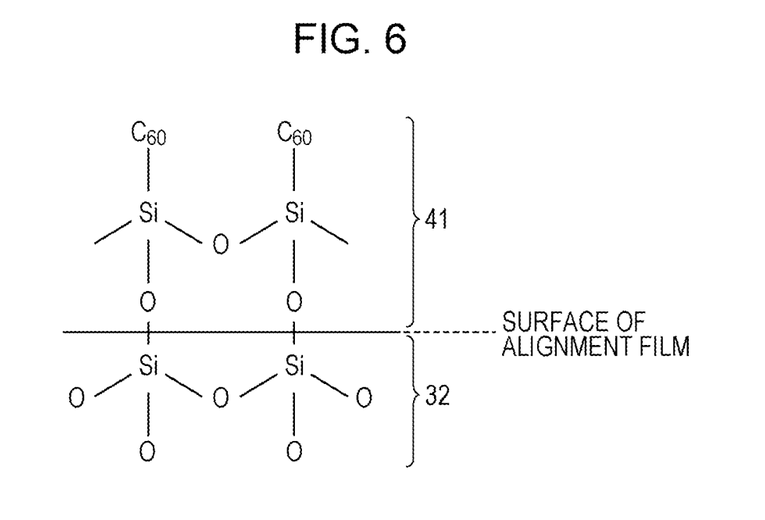
FIG. 6 is a schematic cross-sectional diagram illustrating a state in which fullerenes are modified on the surface of the inorganic alignment film.

FIG. 5 is a schematic cross-sectional diagram illustrating the details of the structure of the surface of the inorganic alignment film. FIG. 6 is a schematic cross-sectional diagram illustrating a state in which the fullerenes are modified on the surface of the inorganic alignment film. Hereinafter, the structure of the film of the silane compound, with which the fullerenes are modified, will be described with reference to FIGS. 5 and 6. Meanwhile, since the structure of the periphery of the inorganic alignment film is substantially the same in both the element substrate and the counter substrate, the counter substrate will be described as an example.

In the counter substrate 20 shown in FIG. 5, the insulation layer 33 and the counter electrode 31 are laminated on the second substrate 20a. The inorganic alignment film 32 is formed on the counter electrodes 31 using, for example, an oblique deposition method. Fullerenes, which are coupled to silanols on the surface of the inorganic alignment film 32, are modified on the inorganic alignment film 32. The film on the inorganic alignment film 32 is referred to as the film 41 (first film) of the silane compound with which the fullerenes are modified.

Fullerenes are materials which are acquired by covalent bonding of carbon atoms into a soccer ball shape, and have a property of capturing radicals.

The film 41 of the silane compound, with which the fullerenes are modified, is a film acquired by modifying the fullerenes with the silane compound and coupling the fullerenes to the silanols on the surface of the inorganic alignment film 32 as shown in FIG. 6. Here, fullerene C60 is modified as the fullerene. Meanwhile, higher-order fullerenes (C70, C74, C76, C78, and the like) are examples of other fullerenes.

Meanwhile, only fullerene C60 may be used as a fullerene which is modified with the silane compound, or a mixture of the fullerene with higher-order fullerenes may be used. In addition, an individual higher-order fullerene may be used, and a mixture of the fullerene with the higher-order fullerenes may be used.

In addition, for example, monohalogenated silanes (H3SiOR), dialkoxysilanes (H2Si(OR)2), trialkoxysilanes (HSi(OR)3), and the like may be examples of the silane compound.

Method of Manufacturing Liquid Crystal Device

Figure 7:
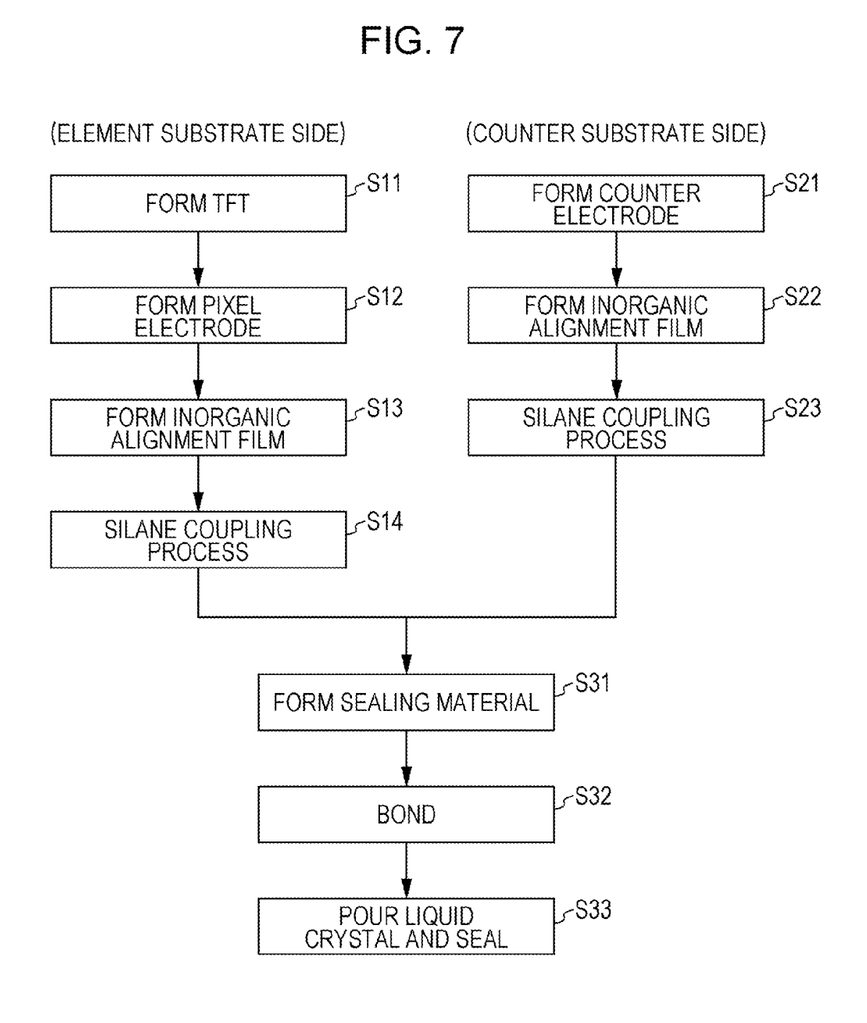
FIG. 7 is a flowchart illustrating a method of manufacturing the liquid crystal device in process order.
Figure 8:
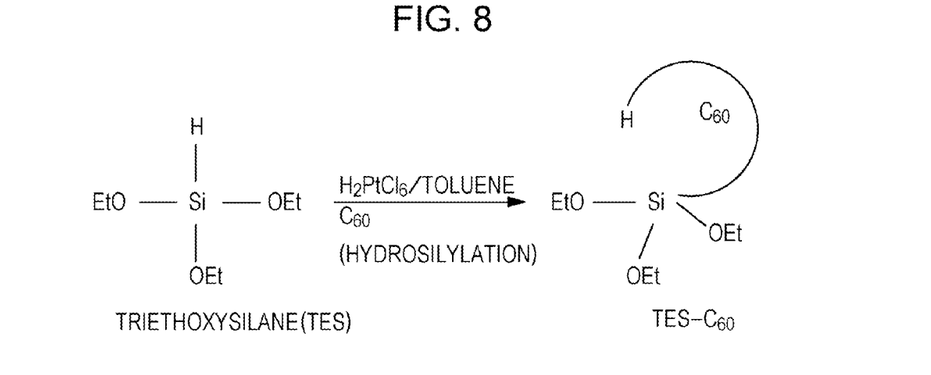
FIG. 8 is a schematic diagram illustrating a state in which the fullerenes are modified with a silane compound.
Figure 9:
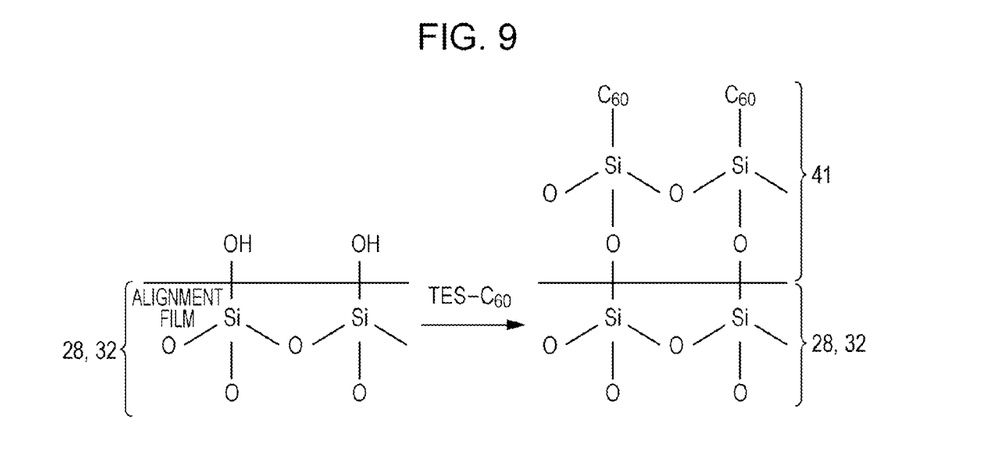
FIG. 9 is a schematic cross-sectional diagram illustrating a state in which the film of a silane compound, with which the fullerenes are modified, is formed on the surface of the inorganic alignment film.

FIG. 7 is a flowchart illustrating a method of manufacturing a liquid crystal device in process order. FIG. 8 is a schematic diagram illustrating a state in which the fullerene is modified with the silane compound. FIG. 9 is a schematic cross-sectional diagram illustrating a state in which the film of the silane compound, with which the fullerene is modified, is formed on the surface of the inorganic alignment film. Hereinafter, the method of manufacturing the liquid crystal device will be described with reference to FIGS. 7 to 9.

Initially, a method of manufacturing the side of the element substrate 10 will be described. First, in step S11, the TFT 30 is formed on the first substrate 10a which is formed of a quartz substrate. More specifically, first, the lower side light shading film 3c (scan line), which is formed of aluminum or the like, is formed on the first substrate 10a. Thereafter, the base insulation layer 11a, which is formed of silicon oxide or the like, is formed using a well-known forming technology.

Subsequently, the TFT 30 is formed on the base insulation layer 11a. More specifically, the TFT 30 is formed using a well-known forming technology, a photolithography technology and an etching technology.

In step S12, the pixel electrode 27 is formed. As described above, the pixel electrode 27 is formed using a well-known forming technology, photolithography technology, and etching technology as the manufacturing method.

In step S13, the inorganic alignment film 28 is formed. More specifically, the inorganic alignment film 28 is formed using the oblique deposition method so as to cover the pixel electrode 27 or the like using a deposition apparatus. The deposition material is silicon oxide ($SiO_2$). Accordingly, the inorganic alignment film 28, having a column (pillar-shaped structure) stacked in a pillar shape so as to be inclined at a predetermined angle, is formed on the surface of the element substrate 10.

In step S14, a silane coupling process is performed on the surface of the inorganic alignment film 28. A shown in FIG. 8, first, fullerene C60 is modified with the silane compound (Triethoxysilane: TES). In the embodiment, any one of the fullerenes C60, C70, C74, C76, and C78 may be used, and it is preferable to use fullerene C60.

A hydrosilylation reaction (Hydrosilylation) is performed using a well-known method. Although a solvent which is used for the hydrosilylation reaction is not particularly limited, the solvent may be, for example, toluene. Further, is it preferable to use a solvent, such as platinum chloride hexahydrate (H2PtCl6) in conjunction.

Subsequently, a surface process is performed using a silane coupling method which is a well-known method such that the fullerene C60 is modified with the inorganic alignment film 28. More specifically, as show in FIG. 9, the film is formed by coupling the silane compound, with which the fullerene C60 is modified, to the silanols on the surface of the inorganic alignment film 28.

According to the method, the film 41 of the silane compound, with which the fullerenes are modified, is formed to cover the inorganic alignment film 28. Therefore, for example, even when excessive light is applied to the liquid crystal layer 15 and radicals are generated, it is possible to capture radicals using the fullerene, and it is possible to suppress the deterioration of the display quality such as the generation of the alignment defect of the liquid crystal.

In addition, since the film 41 is formed by coupling the silane compound with which fullerene C60 is modified to the silanols on the surface of the inorganic alignment film 28, it is possible to prevent the fullerene being separated from the surface of the inorganic alignment film 28. As above, the side of the element substrate 10 is completed. Subsequently, a method of manufacturing the side of the counter substrate 20 will be described.

First, in step S21, the counter electrode 31 is formed on the second substrate 20a, which is formed of a transparent material such as a glass substrate, using a well-known forming technology, a photolithography technology, and an etching technology.

In step S22, the inorganic alignment film 32 is formed on the counter electrode 31. A method of manufacturing the inorganic alignment film 32 is the same as the case of the inorganic alignment film 28, and the inorganic alignment film 32 is formed using, for example, the oblique deposition method.

In step S23, a silane coupling process is performed on the surface of the inorganic alignment film 32. More specifically, substantially similarly to the side of the element substrate 10, the silane compound, with which the fullerene is modified, is coupled to the silanols on the surface of the inorganic alignment film 32 using a silane coupling method.

As above, the side of the counter substrate 20 is completed. Subsequently, a method of bonding the element substrate 10 to the counter substrate 20 will be described.

In step S31, the sealing material 14 is applied on the element substrate 10. More specifically, the sealing material 14 is applied to the peripheral section of the display area E (to surround the periphery of the display area E) in the element substrate 10 by changing the relative positional relationship between the element substrate 10 and a dispenser (a discharging device is possible).

For example, ultraviolet radiation curable epoxy resin may be an example of the sealing material 14. Meanwhile, the sealing material is not limited to a photocuring resin such as the ultraviolet radiation curable epoxy resin, and a thermosetting type resin or the like may be used. In addition, a gap material, such as a spacer, for setting, for example, the interval (gap or cell gap) between the element substrate 10 and the counter substrate 20 to a predetermined value may be included in the sealing material 14.

In step S32, the element substrate 10 is bonded to the counter substrate 20. More specifically, the element substrate 10 is bonded to the counter substrate 20 through the sealing material 14 which is applied to the element substrate 10.

In step S33, liquid crystal is poured into the inside of the structure from a liquid crystal pouring port. Thereafter, the liquid crystal pouring port is sealed by the sealing material. As above, the liquid crystal device 100 is completed.

Configuration of Electronic Apparatus

Figure 10:
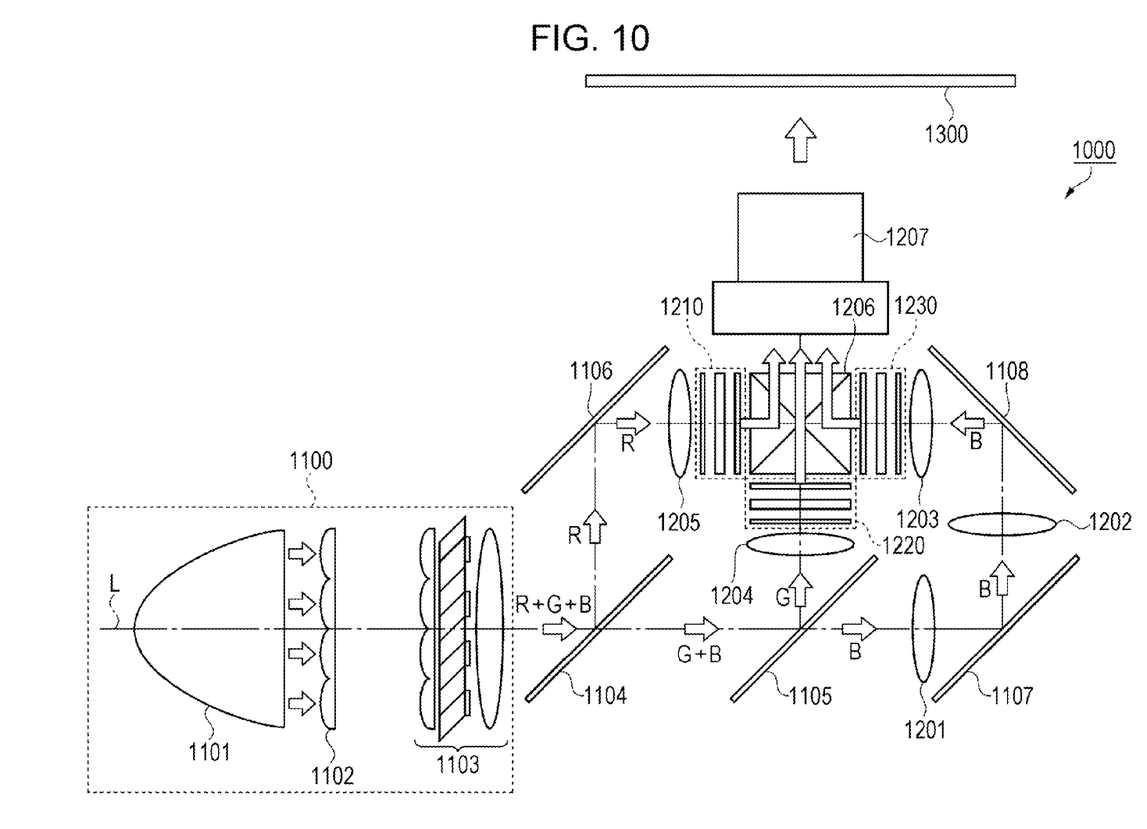
FIG. 10 is an outline diagram illustrating the configuration of a projection type display apparatus which includes a liquid crystal device.

Subsequently, a projection type display apparatus as an electronic apparatus according to the embodiment will be described with reference to FIG. 10. FIG. 10 is an outline diagram illustrating the configuration of the projection type display apparatus which includes the liquid crystal device.

As shown in FIG. 10, a projection type display apparatus 1000 according to the embodiment includes a polarization illumination device 1100 which is arranged along the optical axis L of a system, two dichroic mirrors 1104 and 1105 as a light separation element, three reflection mirrors 1106, 1107, and 1108, five relay lenses 1201, 1202, 1203, 1204, and 1205, transmission type liquid crystal light valves 1210, 1220, and 1230 as three light modulation sections, a cross dichroic prism 1206 as a photosynthetic element, and a projection lens 1207.

The polarization illumination device 1100 includes a lamp unit 1101 as a light source having a white light source such as a ultrahigh pressure mercury lamp or a halogen lamp, an integrator lens 1102, and a polarization conversion element 1103.

The dichroic mirror 1104 causes red color light (R) to be reflected and green color light (G) and blue color light (B) to be transmitted from a polarized light flux, which is emitted from the polarization illumination device 1100. Another dichroic mirror 1105 causes green color light (G) which is transmitted through the dichroic mirror 1104 to be reflected and causes blue color light (B) to be transmitted.

After red light (R), which is reflected in the dichroic mirror 1104, is reflected in the reflection mirror 1106, red light (R) is incident to the liquid crystal light valve 1210 through the relay lens 1205. Green color light (G), which is reflected in the dichroic mirror 1105, is incident to the liquid crystal light valve 1220 through the relay lens 1204. Blue color light (B), which is transmitted through the dichroic mirror 1105, is incident to the liquid crystal light valve 1230 through a light guiding section which includes the three relay lenses 1201, 1202, and 1203 and the two reflection mirrors 1107 and 1108.

The liquid crystal light valves 1210, 1220, and 1230 are respectively arranged to face the incident surfaces of the cross dichroic prism 1206 for the respective colors of light. Color light which is incident to the liquid crystal light valves 1210, 1220, and 1230 is modulated based on image information (image signal), and is emitted to the cross dichroic prism 1206.

The prism is formed in such a way that four perpendicular prisms are bonded, and a dielectric multi-layer film, which reflects red color light in the inner surface thereof, and a dielectric multi-layer film, which reflects blue color light, are formed in a cross shape. Three-color light is synthesized by the dielectric multi-layer films, and light which indicates the color image is synthesized. The synthesized light is projected on a screen 1300 by the projection lens 1207, which is an optical projection system, and the image is enlarged and displayed.

The above-described liquid crystal device 100 is applied to the liquid crystal light valve 1210. The liquid crystal device 100 is arranged between a pair of polarizing elements, which are arranged in a crossed Nichol prism on sides in which color light is incident and is emitted, with gaps. The liquid crystal device 100 is applied to the other liquid crystal light valves 1220 and 1230 in the same manner.

According to the projection type display apparatus 1000, the liquid crystal light valves 1210, 1220, and 1230 are used, and thus it is possible to acquire high reliability.

Meanwhile, it is possible to use various electronic apparatuses, such as an Electrical View Finder (EVF), a mini mobile projector, a head up display, a smartphone, a mobile phone, a mobile computer, a digital camera, a digital video camera, a display, an on-board unit, an audio apparatus, an exposure apparatus, and a lighting apparatus, as an electronic apparatus, on which the liquid crystal device 100 is mounted, in addition to the projection type display apparatus 1000.

As described above, according to the liquid crystal device 100 according to the first embodiment, the method of manufacturing the liquid crystal device 100, and the electronic apparatus, the following advantages may be acquired.

(1) According to the liquid crystal device 100 of the first embodiment, the film 41 of the silane compound, with which fullerene C60 is modified, is arranged to cover the inorganic alignment film 32(28). Therefore, even when, for example, excessive light is applied to the liquid crystal layer 15 and radicals are generated, it is possible to capture the radicals using the fullerene C60, and thus it is possible to suppress the deterioration of the display quality such as the generation of the alignment defect of the liquid crystal. In addition, since the film 41 is arranged by coupling the silane compound, with which the fullerenes are modified, to the silanols on the surface of the inorganic alignment film 32, it is possible to suppress separation of the fullerene from the surface of the inorganic alignment film 32.

(2) According to the method of manufacturing the liquid crystal device 100 of the first embodiment, the film 41 of the silane compound, with which fullerene C60 is modified, is formed to cover the inorganic alignment film 32(28). Therefore, even when, for example, excessive light is applied to the liquid crystal layer 15 and the radicals are generated, it is possible to capture the radicals using the fullerene C60, and thus it is possible to suppress the deterioration of the display quality such as the generation of the alignment defect of the liquid crystal.

(3) According to the electronic apparatus of the first embodiment, the liquid crystal device 100 is included, and thus it is possible to provide an electronic apparatus in which the deterioration of the display quality is suppressed.

Second Embodiment

Figure 11:
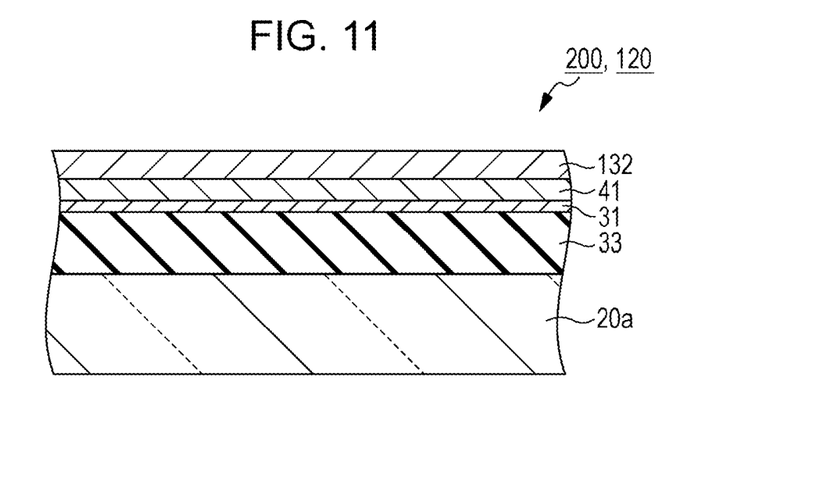
FIG. 11 is a schematic cross-sectional diagram illustrating the structure of a liquid crystal device (counter substrate) according to a second embodiment.

Configuration of Liquid Crystal Device and Method of Manufacturing Liquid Crystal Device FIG. 11 is a schematic cross-sectional diagram illustrating the structure of a liquid crystal device (counter substrate) according to a second embodiment. Hereinafter, the structure of the liquid crystal device will be described with reference to FIG. 11.

The liquid crystal device 200 according to the second embodiment is different from the above-described liquid crystal device 100 according to the first embodiment in that the film 41 (second film) of the silane compound, with which the fullerenes are modified, is arranged on the base of an alignment film 132 (second alignment film, and the side of the element substrate corresponds to the first alignment film), and the other parts are generally similar to the liquid crystal device 100 according to the first embodiment. Therefore, in the second embodiment, parts which are different from the first embodiment will be described in detail and the description of other common parts will be appropriately omitted. Meanwhile, the counter substrate 120 will be described as an example similarly to the first embodiment.

As shown in FIG. 11, in the counter substrate 120 of the liquid crystal device 200 according to the second embodiment, an insulation layer 33 is arranged on a second substrate 20a, and a counter electrodes 31 is arranged on the insulation layer 33. The film 41 of a silane compound, with which the fullerenes are modified, is arranged on the counter electrodes 31. Further, an alignment film 132 is arranged on the film 41 of the silane compound with which the fullerenes are modified. Meanwhile, the alignment film 132 according to the embodiment may be an inorganic alignment film or an organic alignment film.

According to the configuration, although the amount of silanols on the surface of the counter electrodes 31 is small and it is difficult to couple the silanols to the silane compound with which the fullerene is modified, the film 41 of the silane compound, with which the fullerenes are modified, is arranged on the base of the alignment film 132. Therefore, even when, for example, excessive light is applied to the liquid crystal layer 15 and radicals are generated, it is possible to capture the radicals which are transmitted through the alignment film 132 using the fullerene. Accordingly, it is possible to suppress the deterioration of the display quality such as the generation of the alignment defect of the liquid crystal.

In addition, since the alignment film 132 is arranged on the film 41 of the silane compound, with which the fullerenes are modified, and the alignment film 132 directly comes into contact with the liquid crystal, it is possible to increase an orientation regulation force, compared to the liquid crystal device 100 according to the first embodiment.

A method of manufacturing the liquid crystal device 200 according to the second embodiment is the same as in the first embodiment until the pixel electrodes 27 are formed from the first substrate 10a and the counter electrodes 31 are formed from the second substrate 20a. The film 41 may be formed using a silane coupling method or another well-known method as a method of forming the film 41 of the silane compound, with which the fullerenes are modified, on the pixel electrodes 27 and the counter electrode 31, similarly to the first embodiment.

As described above, according to the liquid crystal device 200 of the second embodiment and the method of manufacturing the liquid crystal device 200, the following advantages may be acquired.

(4) According to the liquid crystal device 200 of the second embodiment and the method of manufacturing the liquid crystal device 200, the film 41 of the silane compound, with which fullerene C60 is modified, is formed on the base of the alignment film 132. Therefore, even when, for example, excessive light is applied to the liquid crystal layer 15 and radicals are generated, it is possible to capture the radicals, which are transmitted through the alignment film 132, using the fullerene C60. Accordingly, it is possible to suppress the deterioration of the display quality such as the generation of the alignment defect of the liquid crystal. In addition, the alignment film 132 is arranged on the film 41 of the silane compound, with which the fullerene C60 is modified, and the alignment film 132 directly comes into contact with the liquid crystal, and thus it is possible to increase an orientation regulation force.

Third Embodiment

Figure 12:
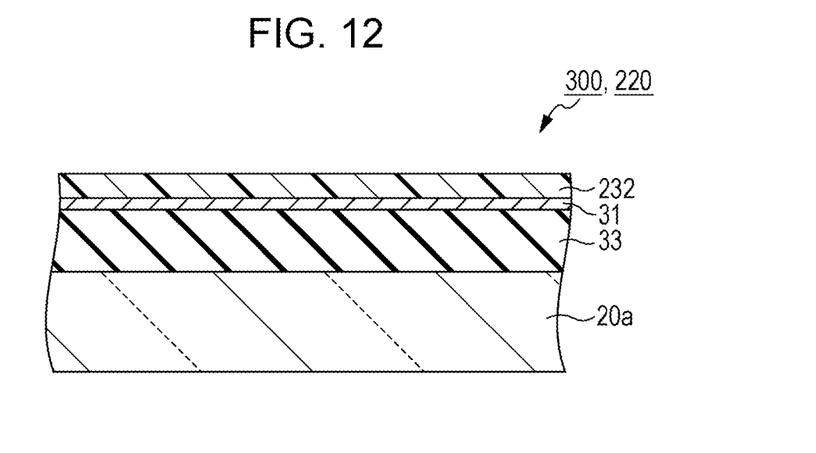
FIG. 12 is a schematic cross-sectional diagram illustrating the structure of a liquid crystal device (counter substrate) according to a third embodiment.
Figure 13:
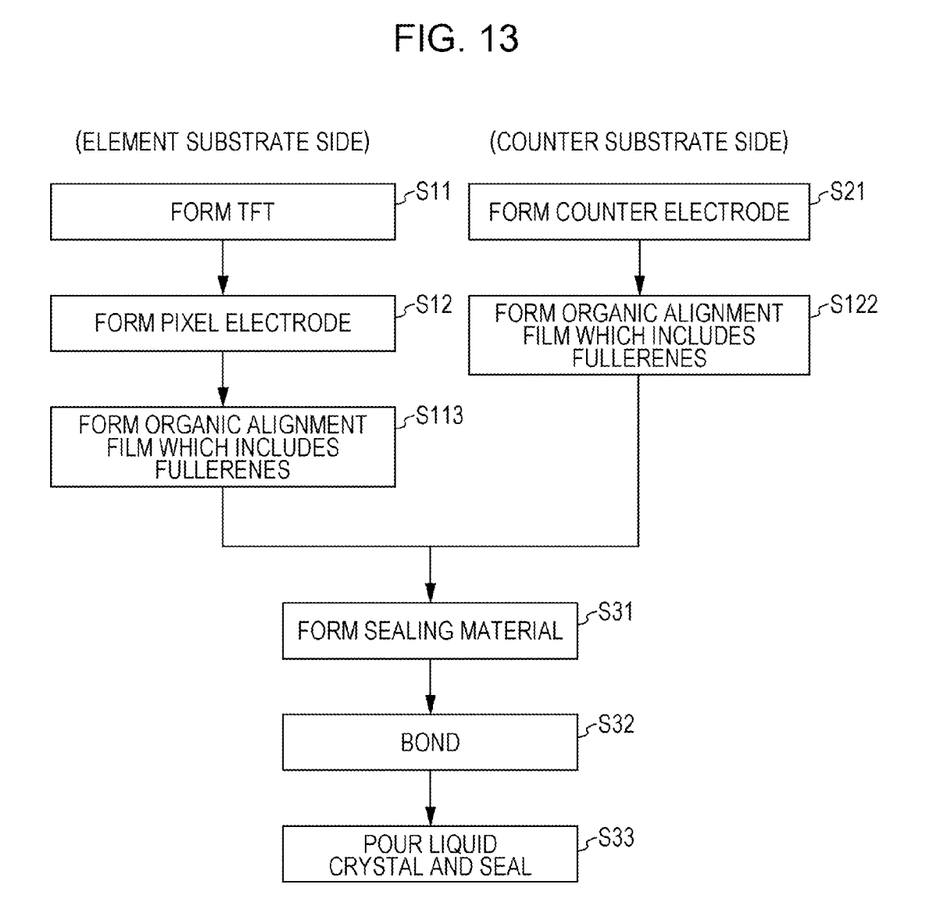
FIG. 13 is a flowchart illustrating a method of manufacturing the liquid crystal device in process order.

Configuration of Liquid Crystal Device and Method of Manufacturing Liquid Crystal Device FIG. 12 is a schematic cross-sectional diagram illustrating the structure of a liquid crystal device (counter substrate) according to a third embodiment. FIG. 13 is a flowchart illustrating a method of manufacturing the liquid crystal device in process order. Hereinafter, the structure of the liquid crystal device according to the third embodiment and the method of manufacturing the liquid crystal device will be described with reference to FIGS. 12 and 13. Meanwhile, FIG. 12 illustrates only the counter substrate similarly to the first embodiment and the second embodiment.

A liquid crystal device 300 according to the third embodiment is different from the liquid crystal device 100 according to the first embodiment in that the alignment film is an organic alignment film 232 and the organic alignment film 232 includes the fullerenes, and the other parts are generally similar to the liquid crystal device 100 according to the first embodiment. Therefore, in the third embodiment, parts which are different from the first embodiment will be described in detail and the description of other common parts will be appropriately omitted.

As shown in FIG. 12, the counter substrate 220 of the liquid crystal device 300 according to the third embodiment is arranged from the second substrate 20a to the counter electrode 31 as in the first embodiment. The organic alignment film 232 (second organic alignment film), which includes the fullerene C60, is arranged on the counter electrode 31. The fullerene C60 is configured to be included in the entire organic alignment film 232 in addition to the surface of the organic alignment film 232. In other words, the organic alignment film 232 is the fullerene on which polyimidization is performed.

According to the structure, the organic alignment film 232 is configured to include polyimide including the fullerene C60. Therefore, even when, for example, excessive light is applied to the liquid crystal layer 15 and radicals are generated, it is possible to capture the radicals using the fullerene C60. In addition, since the fullerene C60 is included in the entire organic alignment film 232, it is possible to increase a radical capturing ability. Accordingly, it is possible to suppress the deterioration of the display quality such as the generation of the alignment defect of the liquid crystal. In addition, it is possible to apply the invention to the organic alignment film 232.

Subsequently, a method of manufacturing the liquid crystal device 300 according to the third embodiment will be described. First, the method of manufacturing the element substrate 10 is the same as in the first embodiment up to step S12 as shown in FIG. 13. In step S113, an organic alignment film (first organic alignment film) including the fullerene C60 is formed. More specifically, the fullerene C60 is modified with polyamic acid, is applied to the pixel electrode 27, and is changed into imide (baked). Accordingly, it is possible to form the organic alignment film including the fullerene C60. Thereafter, a rubbing process is performed. Meanwhile, it is possible to perform the rubbing process as necessary.

In addition, in the method of manufacturing the counter substrate 220, step S21 is the same as in the first embodiment. In step S122, the organic alignment film 232 including the fullerene C60 is formed on the counter substrate 220. More specifically, the fullerene C60 is modified to polyamic acid, is applied on the counter electrodes 31, and is changed into imide. Accordingly, it is possible to form the organic alignment film 232 including the fullerene C60. Thereafter, the rubbing process is performed. Meanwhile, as described above, it is possible to perform the rubbing process as necessary.

The method of manufacturing the counter substrate 220 is the same as in the first embodiment from step S31 to step S33.

As described above, according to the liquid crystal device 300 according to the third embodiment and the method of manufacturing the liquid crystal device 300, the following advantages may be acquired.

(5) According to the liquid crystal device 300 of the third embodiment and the method of manufacturing the liquid crystal device 300, the organic alignment film 232 is formed of polyimide including the fullerene C60. Therefore, even when, for example, excessive light is applied to the liquid crystal layer 15 and radicals are generated, it is possible to capture the radicals using the fullerene C60. Accordingly, it is possible to suppress the deterioration of the display quality such as the generation of the alignment defect of the liquid crystal. In addition, since the fullerene C60 is included in the entire organic alignment film 232, it is possible to increase a radical capturing ability. Accordingly, it is possible to further suppress the deterioration of the display quality such as the generation of the alignment defect of the liquid crystal. In addition, it is possible to apply the invention to the organic alignment film 232.

Meanwhile, the forms of the invention are not limited to the above-described embodiments, and may be appropriately modified without departing from the claims and the gist or spirit of the invention, which is read from the entire specification. Further, the forms of the invention are included in the technical scope of the forms of the invention. In addition, it is possible to implement the invention in the following form.

First Modification Example

As above, the film 41 of the silane compound, with which the fullerenes are modified, is not limited to be arranged on both the element substrate 10 and the counter substrate 20. For example, the film 41 of the silane compound, with which the fullerenes are modified, may be arranged on only one of the substrates. Accordingly, since the film 41 of the silane compound, with which the fullerenes are modified, is arranged on at least one of the substrates (element substrate 10 or the counter substrate 20), it is possible to capture the radicals in the liquid crystal layer 15.

The entire disclosure of Japanese Patent Application No. 2014-003961, filed Jan. 14, 2014 is expressly incorporated by reference herein.

What is claimed is:

1. A liquid crystal device comprising:
a first substrate;
a second substrate that is arranged to face the first substrate;
a liquid crystal layer that is arranged between the first substrate and the second substrate;
a first inorganic alignment film that is arranged between the first substrate and the liquid crystal layer; and
a second inorganic alignment film that is arranged between the second substrate and the liquid crystal layer,
wherein
a first film and a second film are formed of fullerenes modified with a silane compound,
the first film is arranged between the liquid crystal layer and the first inorganic alignment film, and
the second film is arranged between the liquid crystal layer and the second inorganic alignment film.

2. The liquid crystal device according to claim 1, wherein the fullerenes include at least one of fullerene C60 and a higher-order fullerene.

3. An electronic apparatus comprising the liquid crystal device according to claim 1.

4. An electronic apparatus comprising the liquid crystal device according to claim 2.

5. A liquid crystal device comprising:
a first substrate;
a second substrate that is arranged to face the first substrate;
a liquid crystal layer that is arranged between the first substrate and the second substrate;
a first alignment film that is arranged between the first substrate and the liquid crystal layer; and
a second alignment film that is arranged between the second substrate and the liquid crystal layer,
wherein
a second film, which includes fullerenes, is arranged between the first alignment film and the first substrate and between the second alignment film and the second substrate,
a third film, which includes fullerenes, is arranged between the first alignment film and the first substrate, and
a fourth film, which includes fullerenes, is arranged between the second alignment film and the second substrate.

6. The liquid crystal device according to claim 5, wherein the fullerenes include at least one of fullerene C60 and a higher-order fullerene.

7. An electronic apparatus comprising the liquid crystal device according to claim 5.

8. An electronic apparatus comprising the liquid crystal device according to claim 6.

* * * * *